(12) United States Patent
Lilja et al.

(10) Patent No.: US 6,789,157 B1
(45) Date of Patent: Sep. 7, 2004

(54) PLUG-IN EQUIPPED UPDATEABLE FIRMWARE

(75) Inventors: Michael M. Lilja, Kastrup (DK); Niels Beier, Herlev (DK); Ulrich Rysgaard, Allerod (DK)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 09/608,391

(22) Filed: Jun. 30, 2000

(51) Int. Cl.[7] ............................. G06F 12/02; G06F 9/44
(52) U.S. Cl. ................... 711/103; 711/102; 711/104; 711/170; 713/190; 713/191; 717/168; 719/331
(58) Field of Search ....................... 711/103, 102, 711/104, 105, 1, 170; 717/168; 719/331; 713/1, 190, 191

(56) References Cited

U.S. PATENT DOCUMENTS

| | | | | |
|---|---|---|---|---|
| 5,835,933 A | * | 11/1998 | Wells et al. | .............. 711/103 |
| 5,878,256 A | * | 3/1999 | Bealkowski et al. | .......... 713/2 |
| 6,009,497 A | * | 12/1999 | Wells et al. | .............. 711/103 |
| 6,253,281 B1 | * | 6/2001 | Hall | .......................... 711/112 |
| 6,536,038 B1 | * | 3/2003 | Ewertz et al. | .............. 717/168 |

* cited by examiner

Primary Examiner—Gary Portka
Assistant Examiner—Jasmine Song
(74) Attorney, Agent, or Firm—Blakely, Sokoloff, Taylor & Zafman LLP

(57) ABSTRACT

A Plug-in equipped updateable firmware includes a number of value added software or "plug-in" modules stored in association with a firmware module within a non-volatile memory device, such as FLASH. In one embodiment, the plug-in and firmware modules are stored in a compressed form within the FLASH, whereupon during boot-up they are extracted into random access memory (RAM). The firmware is extracted into the RAM at a predetermined memory address, whereas each plug-in is extracted into the RAM at a re-allocable memory address. In one embodiment, the memory address associated with each extracted plug-in is stored in a table for reference by the firmware. When the firmware calls a function of a plug-in stored within RAM, the firmware references the table to locate the memory address for the extracted plug-in, and initialization code within the plug-in returns to the firmware a pointer to the function.

27 Claims, 4 Drawing Sheets

PLUG-IN EQUIPPED UPDATEABLE FIRMWARE

BACKGROUND OF THE INVENTION

1. Field of the Invention

The present invention generally relates to data processing. More specifically, the present invention relates to plug-in equipped updateable firmware.

2. Background Information

Whether it is viewed as a useful communication tool, or the impetus behind electronic commerce, the Internet has truly changed the way we live and work. As Internet use continues to increase, the amount of data transmitted over the various networks comprising the Internet likewise continues to increase. A growing number of companies have focused their attention on offering goods and services for sale to consumers over the Internet. Although some businesses refuse to completely supplant conventional "pen and paper" transactions, other businesses have been formed solely to facilitate e-commerce transactions.

As the number of electronic transactions increases, so too does the amount of personal data transmitted and/or exchanged over the Internet and associated networks. On-line transactions can include the exchange of such seemingly innocuous data as color preference, to extremely personnel data such as medical histories and credit card numbers. In any event, the value of the data is often determined by its owner as what may seem worthless to one may be priceless to another.

Accordingly, data privacy with respect to Internet transactions has become a concern for many consumers and businesses alike. Encryption is one mechanism that has been widely utilized in a variety of devices to protect data. In the field of data communications for example, encryption is utilized in network switches and routers to secure data that passes through such devices. In fact, encryption is considered so effective that in some countries such as the United States, exportation of certain encryption technologies is considered illegal.

Although strong encryption is considered a desirable feature by data privacy advocates, it presents logistical problems for manufactures of the devices implementing the encryption. For example, if a network device incorporating strong encryption is located in a country that does not regulate encryption, the owner or user of the device would be free to export the device to another country for sale or service. If, for example, the device was exported to the U.S. for repair, however, the device would not be returnable to the originating country with the encryption intact. In devices such as routers that utilize firmware-based operating systems, removal of encryption typically requires the reprogramming of the entire firmware resulting in the loss of customized configuration settings. Reprogramming of the configuration setting can take a long time depending upon the skill of the user.

Furthermore, when a device such as a router is serviced, or new software is installed, it is often necessary for the manufacturer to test operation of the device before shipment. Often, this involves what is known as interoperability testing where a device is tested in association with a family of compatible products to determine if the repair or new software is error free with respect to the compatible devices. Depending upon the extent of compatibility or the length of code, this interoperability testing may take days, weeks, and even months.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
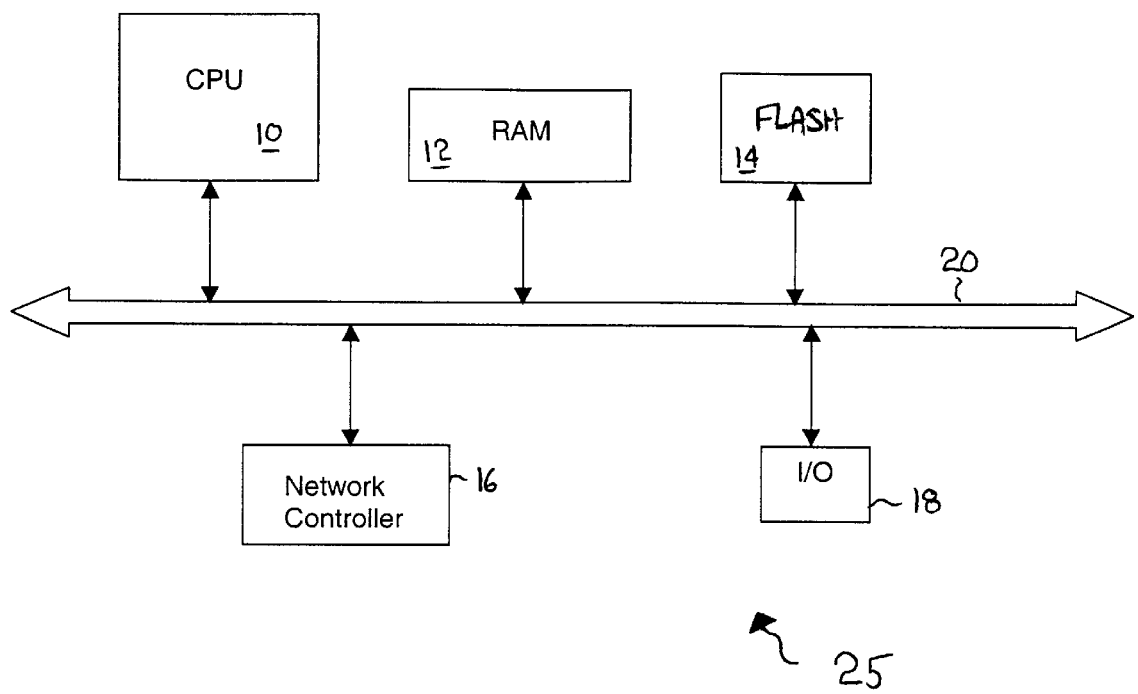
FIG. 1 is a block diagram illustrating an exemplary system according to one embodiment of the present invention.

Plug-in equipped updateable firmware is described herein. In accordance with one embodiment of the invention, the term "plug-in" is used herein to refer to modularized, value added software for use with or without firmware. In one embodiment, a number of plug-in modules are stored in association with a firmware module within a non-volatile memory device, such as FLASH. In one embodiment, the plug-in and firmware modules are stored in a compressed form within the FLASH, whereupon during boot-up they are extracted into random access memory (RAM). In one embodiment, the firmware is extracted into the RAM at a predetermined memory address, whereas each plug-in is extracted into the RAM at a re-allocable memory address. In one embodiment, the memory address associated with each extracted plug-in is stored in a table for reference by the firmware. In one embodiment, when the firmware calls a function of a plug-in stored within RAM, the firmware references the table to locate the memory address for the extracted plug-in, and initialization code within the plug-in returns to the firmware a pointer to the function.

Parts of the following description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn, in a manner that is most helpful in understanding the present invention, however, the order of description should not be construed as to imply that these operations are necessarily order dependent, in particular, upon the order the steps are presented. Furthermore, reference in the specification to "one embodiment" or "an embodiment" means that a particular feature, structure, or characteristic described in connection with the embodiment is included in at least one embodiment of the invention. The phrase "in one embodiment" will be used repeatedly, however the phrase does not necessarily refer to the same embodiment, although it may.

In one embodiment of the invention, a number of downloadable plug-in images, or "modules" are stored within FLASH memory. In one embodiment, the plug-in modules are downloaded into a first memory device such as FLASH, extracted into a second memory device such as RAM, and called for execution by a firmware module also extracted into the RAM. Although, in one embodiment, the firmware and plug-in modules are stored within an updateable FLASH memory prior to their extraction, other non-volatile memory technologies may also be utilized.

Due to the modularity and overall flexible nature of the plug-ins, the plug-ins may be updated and/or deleted from the FLASH as deemed necessary. For example, in the event that a device, such as a network switch or router, includes a firmware module and an encryption plug-in, the encryption plug-in may be deleted prior to shipping the device out of the country for repair. Accordingly, logistical problems related to National encryption export policies may be avoided. Once the repaired device is returned to the user, the user may download an encryption plug-in to replace the deleted encryption plug-in, if so desired. Plug-in functionality, however, need not be limited to encryption. For example, a downloadable plug-in may include code that when executed provides license verification information to the firmware or associated application. Accordingly, it is possible to download and store one or more plug-in licenses that may be selectively deleted or updated based upon terms negotiated by a user. In one embodiment, plug-ins are updateable and/or downloadable from a number of sources including, but not limited to a network connection, a diskette, a CD-ROM and so forth. Furthermore, once a new or updated plug-in is downloaded, optional interoperability testing for example, need only be performed on the new plug-in module as the remaining portions of the FLASH will have remained unchanged. In one embodiment, plug-ins are downloaded using BOOTP and/or TFTP.

FIG. 1 is a block diagram illustrating an exemplary system according to one embodiment of the present invention. System 25 includes CPU 10, RAM, 12, FLASH 14, network controller 16 and input/output (I/O) controller 18, which are all coupled together via bus 20. Bus 20 represents a data bus to communicate data between the various components of system 25. In one embodiment, bus 20 is based upon a 32-bit local bus architecture. CPU 10 represents a general or special purpose processing device to execute code and process data associated with system 25. In one embodiment, CPU 10 is an i960JT RISC processor available from Intel Corporation, of Santa Clara, Calif. RAM 12 represents a volatile memory device to temporarily store code and data. RAM 12 may comprise any number of volatile memory devices known in the art including SRAM, DRAM, SDRAM, RDRAM, and so forth. Generally, FLASH 14 represents an updateable non-volatile memory device to store code and data for extended periods of time. FLASH 14, however, may comprise any number of non-volatile memory devices known in the art including ROM, PROM, EPROM, EEPROM, and so forth. In one embodiment, FLASH 14 stores firmware and plug-in modules further described herein. In one embodiment, system 25 does not include a memory management unit (MMU). Network controller 16 represents a network interface to enable system 25 to transmit and receive data over a number of networks. In one embodiment, one or more downloadable plug-ins described herein are downloaded via network controller 16. Lastly, I/O controller 18 represents an input/output port through which a user may communicate with system 25. In one embodiment, system 25 is a network routing device equipped to switch and/or route data from one network port to another.

Figure 2:
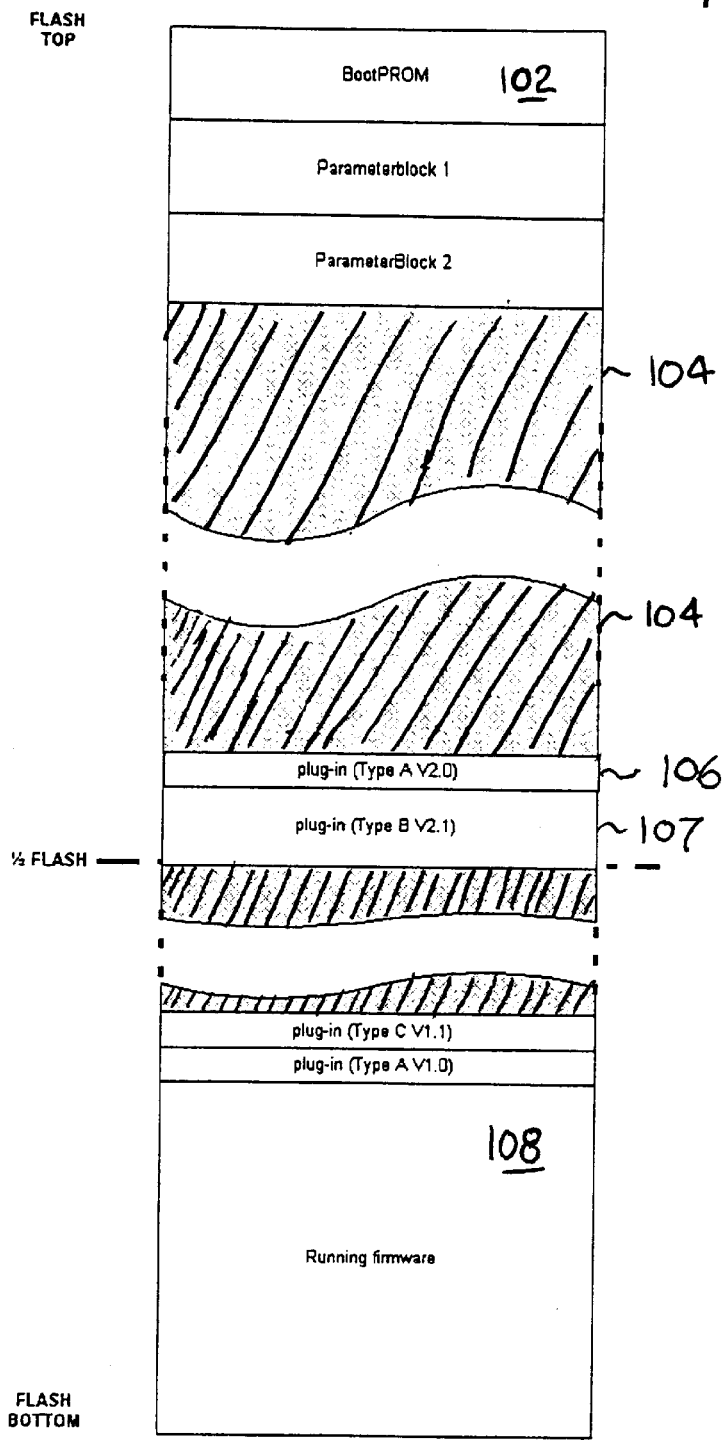
FIG. 2 is a diagram illustrating downloaded plug-ins stored within a memory device according to one embodiment of the invention.

FIG. 2 is a diagram illustrating downloaded plug-ins stored within a memory device, such as FLASH 14, according to one embodiment of the invention. FLASH 14 is shown including BootPROM section 102, firmware 108, plug-in module 106, plug-in module 107, and unused memory 104. BootPROM 102 represents code that when executed, initializes a variety of hardware devices within system 25 including RAM 12 and FLASH 14. Firmware 108 represents a first category of plug-in modules stored within FLASH 14, for example, that when executed provides a desired functionality. For example, in an embodiment where FLASH 14 is included within a network router, firmware 108 may initiate various data communication protocols such as OSPF or BGP. Plug-in modules 106 and 107 represent a second category of plug-in modules stored within FLASH 14. In one embodiment, plug-in module 106 represents a first type of plug-in, whereas plug-in module 107 represents a second type of plug-in. For example, plug-in module 106 may represent an encryption plug-in, whereas plug-in module 107 may represent one or more software licenses. Unused memory area 104 indicates unoccupied memory space within FLASH 14. In one embodiment, plug-in modules may be downloaded into unused memory area 104 for storage within FLASH 14.

FLASH 14 may be configured in both single image FLASH and dual-image FLASH formats. In addition to plug-ins, dual image FLASH is capable of storing both a running copy and a backup copy of firmware. Single image FLASH, on the other hand, is only capable of storing a single firmware image along with the various plug-in modules. By maintaining both running and backup images of firmware and/or plug-ins, a system may be more resilient than those implementations utilizing only a single firmware image. For ease of explanation, the remainder of this disclosure will be described with respect to a single image FLASH, however, a dual or multiple image FLASH device could equivalently be implemented.

According to one embodiment of the invention, a header section is attached to each plug-in stored within the FLASH. In one embodiment, the header section includes a status section, an identifier section, a CRC section, and a block length section, which are all appended to a data section. Both the status and identifier sections are used in association with deleting firmware and/or plug-ins. The CRC section is used as an indicator as to whether the firmware image has been corrupted, whereas the length section of the header provides the ability to step through the various modules stored in FLASH in order to search for a particular plug-in, for example. In one embodiment, bootPROM 102 steps through the headers to identify launcher code which, when executed, will launch the firmware.

In one embodiment of the invention, the stored compressed plug-ins and firmware are extracted to RAM prior to their execution. In one embodiment, extraction of the firmware and plug-ins is accomplished without the use of a memory management unit (MMU). In one embodiment, the firmware is extracted to a predetermined linked execution address within RAM, whereas each plug-in is extracted to a re-allocable memory address. By re-allocable, it is meant that the plug-in is adaptable to execute at any memory address in which the plug-in happens to be stored in. In one embodiment, each successive plug-in identified within the FLASH is extracted to an address in RAM adjacent to the previously extracted plug-in.

In order for the system to know where to place the plug-in in RAM, it needs to know where free memory exists. In one embodiment, the binary images of the firmware and plug-ins are generated to include code and initialized data, however, uninitialized data or "BSS" is not included as part of the image thereby saving space. This, however, means that when the system is booting, the BSS needs to be initialized. In order to determine where the image stops in RAM (i.e., code+data+BSS), the end of the BSS needs to be known so that one module is not written over another previously extracted module. In one embodiment, each image includes its BSS size (including start and end identifiers), CRC value, and CRC size (including CRC start and CRC end identifiers). According to one embodiment of the invention, the modules are extracted into RAM based upon the modules' header contents and BSS data. In one embodiment, modules that are to be extracted to RAM are decompressed and copied to RAM, whereas modules that are not to be extracted are only copied.

Figure 3:
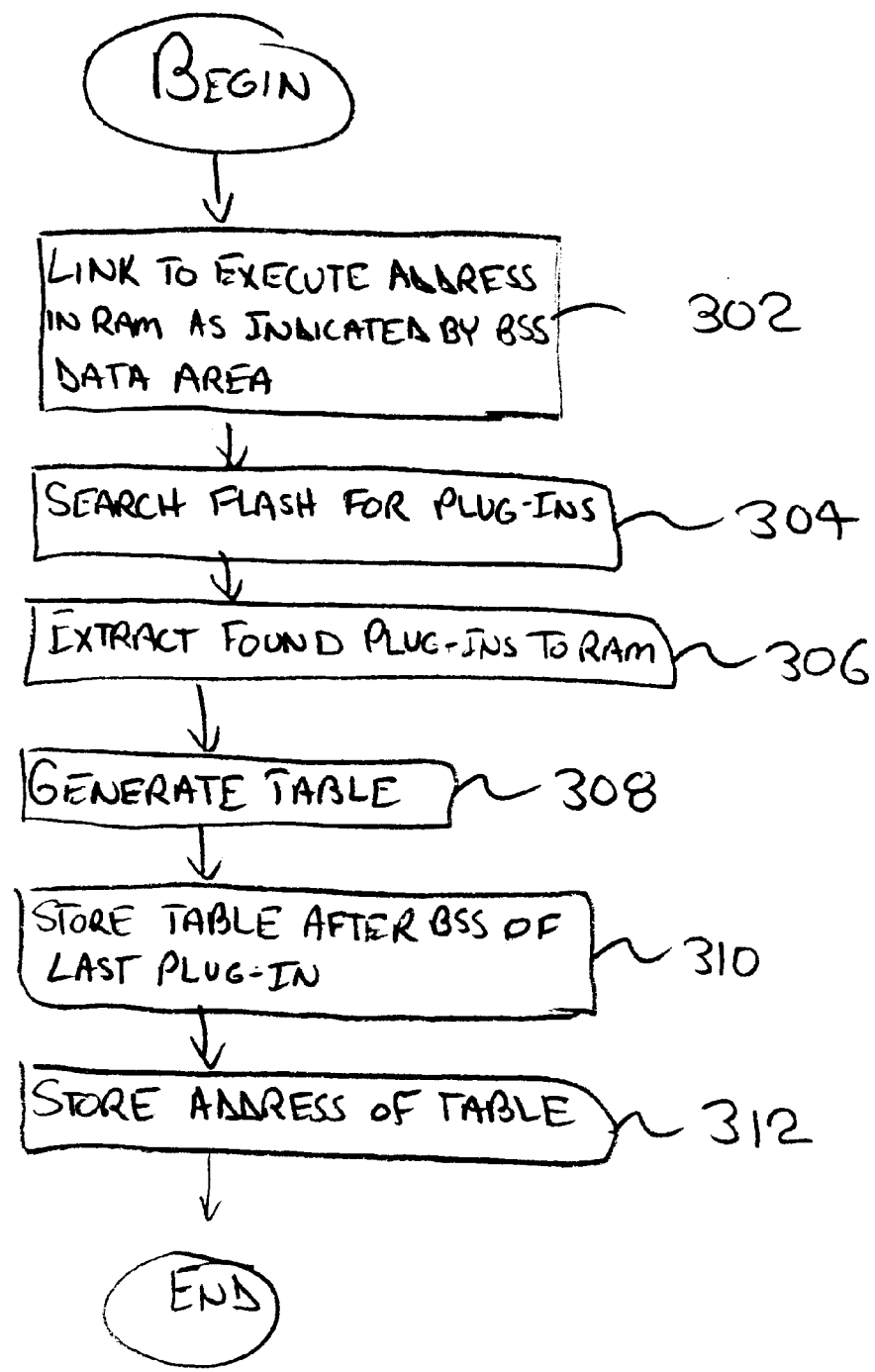
FIG. 3 is a flow diagram illustrating the extraction process within plug-in equipped firmware.

FIG. 3 is a flow diagram illustrating the extraction process within plug-in equipped firmware. The process begins with the system extracting the firmware to a predetermined address in RAM (302). In one embodiment, the predetermined address is a linked execute address indicated by BSS data within the firmware. In one embodiment, the BSS area is available information within the firmware image and can be retrieved without executing the firmware. Once the firmware has been extracted, a search is made through the FLASH to locate existing plug-ins (304). In one embodiment, the plug-ins are extracted into RAM in such a way that the first plug-in is placed right after the BSS end of the firmware and the next plug-in is placed after the BSS end of the previous plug-in, and so forth until the last plug-in is located (306). As the plug-ins are located, a table is created containing information indicating the RAM address where each plug-in is placed and a plug-in type identifier that identifies the plug-in based upon functionality for example (308). Once all plug-ins have been extracted into RAM, the plug-in location table is stored after the last plug-in BSS end (310). Finally, the address of the plug-in table is stored for use by the firmware to locate the plug-ins when they are needed (312).

Figure 4:
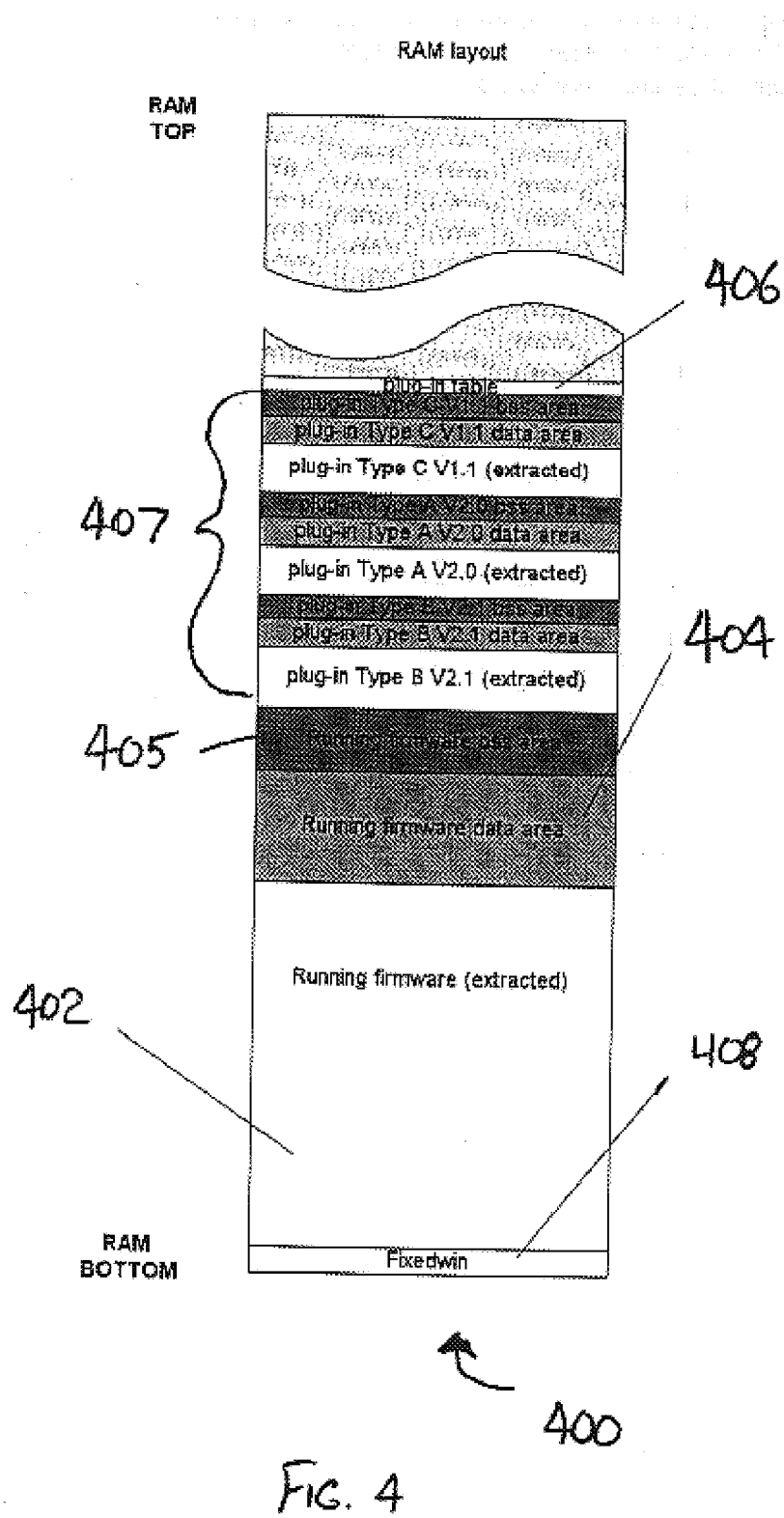
FIG. 4 is a diagram illustrating plug-ins extracted into a memory device according to one embodiment of the invention.

FIG. 4 is a diagram illustrating plug-ins extracted into a memory device according to one embodiment of the invention. FLASH 400 includes firmware section 402, firmware data area 404, firmware BSS section 405, plug-ins 407, plug-in table 406, and fixedwin structure 408. When combined, firmware section 402, firmware data section 404, and firmware BSS section 405 represent the entire size of the extracted firmware. Plug-ins 407 are shown to illustrate that a variety of plug-in types and even varying versions of each plug-in type may be concurrently extracted into RAM. As each plug-in is extracted, the address of the RAM location where it can be found is maintained in a table indicated as plug-in table 406. In one embodiment, the plug-in table is placed in memory above the last plug-in. Lastly, fixedwin structure 408 indicates a section within the FLASH where the plug-in table address is stored. The fixedwin structure is used to pass information from the boot system to the firmware upon execution of the firmware.

During execution, the firmware will call a plug-in execute routine that will look in the plug-in table for the location of the extracted plug-ins. As the firmware locates the plug-ins, it executes them by addressing the address found within the table. In one embodiment, the plug-ins contain an initialization start-up routine that enables the plug-in to adapt to its extracted memory location and execute at this location. The initialization routine returns a pointer to the actual function within the plug-in that can be called by the firmware when accessing the plug-in functions. In one embodiment, the firmware has no advanced knowledge as to what memory location any of the plug-in functions are located at. The firmware is only aware of the plug-in start address as indicated by the table.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

categorizing each of a plurality of software modules stored on a non-volatile memory device as belonging to one of a plurality of module categories;

extracting to a predetermined, fixed memory address within a volatile memory device, a first software module belonging to a first category of software modules, the fixed memory address indicated in the first software module;

extracting to a run-time assigned memory address within the volatile memory device, a second software module categorized as belonging to a second category of software modules; and storing the run-time assigned memory address in the volatile memory device.

2. The method of claim 1, wherein the plurality of software modules are stored in a compressed form.

3. The method of claim 1, wherein extracting includes decompressing.

4. The method of claim 1, further comprising:

calling by the first software module, a function included within the second software module; and resolving the memory address of the called function at such time the function is called.

5. The method of claim 4, wherein resolving further comprises processing initialization code included within the second software module to return to the first software module an offset value associated with the called function.

6. The method of claim 5, wherein the offset value represents an address offset between the run-time assigned memory address of the second software module and the memory address at which the called function resides.

7. The method of claim 1, wherein the plurality of software modules are categorized based at least in part upon content within a module header.

8. The method of claim 1, wherein the predetermined memory address represents a linked execution address.

9. The method of claim 1, wherein the second category of software modules refers to downloadable plug-in modules.

10. The method of claim 1, wherein the first category of software modules refers to firmware.

11. A network routing device comprising:

a bus;

a processor coupled to the bus;

a non-volatile memory device coupled to the bus to store a plurality of software modules including a first category of software modules and a second category of software modules;

a volatile memory device coupled to the bus:

to receive from the non-volatile memory device, a first software module belonging to the first category of software modules and a second software module belonging to a second category of software modules, the first software module to be received at a predetermined, fixed memory address indicated in the first software module within the volatile memory device and the second software module to be received at a run-time assigned memory address within the volatile memory device, and to store the run-time assigned memory address in association with the second software module.

12. The apparatus of claim 11, wherein the second software module is stored in association with the run-time assigned memory address in a table accessible by the first software module.

13. The apparatus of claim 12, wherein the table further identifies a module type for modules belonging to the second category of software modules.

14. The apparatus of claim 11, wherein the second software module further comprises:

a plurality of functions having unresolved memory addresses; and initialization code to facilitate resolution of the unresolved memory addresses.

15. The apparatus of claim 14, wherein when one of the plurality of functions is called by the first software module, the initialization code returns to the first software module, a pointer indicating the memory address for the called function.

16. The apparatus of claim 15, wherein the memory address for the called function is determined by the initialization code based at least in part upon the re-allocable memory address stored in association with the second software module.

17. The apparatus of claim 11, wherein the first memory device comprises FLASH technology.

18. An article comprising:

a machine readable medium having stored thereon a plurality of machine readable instructions, wherein when executed, the instructions cause a processor to:

categorize a plurality of software modules stored within a non-volatile memory device as belonging to one of a plurality of software module categories;

extract to a predetermined, fixed memory address within a volatile memory device, a first software module categorized as belonging to a first category of software modules, the fixed memory address indicated in the first software module;

extract to a run-time assigned memory address within the volatile memory device, a second software module categorized as belonging to a second category of software modules; and store the run-time assigned memory address in the volatile memory device.

19. The article of claim 18, further comprising instructions that cause a processor to:

call a first function included within the second software module, and resolve a memory address for the called function when the function is called.

20. The article of claim 18, wherein the instructions that cause a processor to resolve the memory address further include instructions to process initialization code included within the second software module to return to the first software module an offset value associated with the called function.

21. The article of claim 20, wherein the offset value represents an address offset between the run-time assigned memory address of the second software module and the memory address at which the called function resides.

22. A method comprising:

extracting a first software module from a non-volatile memory and placing it in a first region of a volatile memory having a predetermined, fixed memory address indicated in the first software module;

extracting a second software module from the non-volatile memory and placing it in the volatile memory in a second region having a run-time assigned memory address;

creating a table in the non-volatile memory to store memory address information corresponding to the second software module to enable the first software module to access the second software module; and accessing the table to provide a function from the second software module to the first software module.

23. The method of claim 22, wherein the first region of the volatile memory is contiguous with the second region of the volatile memory.

24. The method of claim 22, wherein accessing the table to provide a function from the second software module to the first software module further comprises:

calling a function, wherein the function is a component of the second software module;

accessing the table to determining the memory address of the called function; and providing the function from the second software module to the first software module.

25. An article of manufacture comprising:

an electronically accessible medium providing instructions that, when executed by one or more machines, cause the one or more machines to extract a first software module from a non-volatile memory and place it in a first region of a volatile memory having a predetermined, fixed memory address indicated in the first software module;

extract a second software module from the non-volatile memory and place it in the volatile memory in a second region having a run-time assigned memory address;

create a table in the non-volatile memory to store memory address information corresponding to the second software module; and access the table to provide a function from the second software module to the first software module.

26. The article of manufacture of claim 25 wherein the first region of the volatile memory is contiguous with the second region of the volatile memory.

27. The article of manufacture of claim 25, wherein the electronically accessible medium providing instructions that, when executed by one or more machines, cause the one or more machines to access the table to provide a function from the second software module to the first software module further comprises instructions that cause one or more machines to:

call a function, wherein the function is a component of the second software module;

access the table to determining the memory address of the called function; and provide the function from the second software module to the first software module.

* * * * *